(12) United States Patent
Wei et al.

(10) Patent No.: US 12,540,707 B2
(45) Date of Patent: Feb. 3, 2026

(54) CORRUGATED PLATE AND LIQUEFIED GAS STORAGE CONTAINER HAVING THE SAME

(71) Applicant: SINOTECH ENERGY CO., LTD., Shanghai (CN)

(72) Inventors: Ying Wei, Shanghai (CN); Wei He, Shanghai (CN)

(73) Assignee: SINOTECH ENERGY CO., LTD., Shanghai (CN)

( * ) Notice: Subject to any disclaimer, the term of this patent is extended or adjusted under 35 U.S.C. 154(b) by 0 days.

(21) Appl. No.: 19/274,576

(22) Filed: Jul. 20, 2025

(65) Prior Publication Data

US 2025/0347386 A1    Nov. 13, 2025

Related U.S. Application Data

(63) Continuation of application No. PCT/CN2025/097328, filed on May 27, 2025.

(30) Foreign Application Priority Data

Feb. 28, 2025   (CN) .......................... 202510228284.8

(51) Int. Cl.
*F17C 1/08* (2006.01)
*F17C 1/00* (2006.01)

(52) U.S. Cl.
CPC ...... *F17C 1/002* (2013.01); *F17C 2203/0619* (2013.01); *F17C 2203/0639* (2013.01);
(Continued)

(58) Field of Classification Search
CPC .............. F17C 2270/0107; F17C 1/002; F17C 2223/0153; F17C 2203/012; F17C 2221/033; F17C 2203/0619; B65D 90/027
See application file for complete search history.

(56) References Cited

U.S. PATENT DOCUMENTS

| 3,299,598 A | 1/1967 | Alleaume | |
|---|---|---|---|
| 2011/0027604 A1* | 2/2011 | Joh | .......... F17C 3/027 428/573 |
| 2018/0202611 A1* | 7/2018 | Sassi | ...... B65D 90/06 |

FOREIGN PATENT DOCUMENTS

| CN | 116498885 A | 7/2023 |
|---|---|---|
| CN | 116511305 A | 8/2023 |

(Continued)

*Primary Examiner* — Stephen J Castellano

(57) ABSTRACT

The present disclosure provides a corrugated plate and a liquefied gas storage container having the same. The corrugated plate comprises a plate body, a first corrugation and a second corrugation orthogonal to each other, and an intersection structure formed at the intersection position. The first corrugations are higher than the second corrugations. The intersection structure comprises a top portion, ridges, and recessed portions. The recessed portions consist of four, each located in one quadrant, formed on the outer side of the first corrugation and sandwiched between a first crest of the first corrugation and a corresponding ridge, and concaved inward relative to the outer side. According to the present disclosure, the intersection structure ensures that the upper and lower surfaces at the intersection position have uniform line lengths, thereby achieving uniform thickness, avoiding excessive thinning, and providing improved structural strength and fatigue resistance.

10 Claims, 6 Drawing Sheets

(52) U.S. Cl.
CPC ... *F17C 2221/011* (2013.01); *F17C 2221/012* (2013.01); *F17C 2221/014* (2013.01); *F17C 2221/017* (2013.01); *F17C 2221/033* (2013.01); *F17C 2223/0153* (2013.01); *F17C 2270/0107* (2013.01)

(56) References Cited

FOREIGN PATENT DOCUMENTS

| | | |
|---|---|---|
| CN | 116817162 A | 9/2023 |
| CN | 118687070 A | 9/2024 |
| GB | 923834 A | 4/1963 |

* cited by examiner

A-A

CORRUGATED PLATE AND LIQUEFIED GAS STORAGE CONTAINER HAVING THE SAME

CROSS-REFERENCE TO RELATED APPLICATIONS

This application is a continuation of International Patent Application No. PCT/CN2025/097328, filed on May 27, 2025, which claims priority to Chinese Patent Application No. 202510228284.8 filed on Feb. 28, 2025, the contents of which are incorporated herein by reference.

TECHNICAL FIELD

This application relates to the field of liquefied gas storage containers for marine engineering equipment, particularly marine equipment such as ships, and more specifically to a corrugated plate and a liquefied gas storage container having the corrugated plate for transport equipment such as ships. The storage container is particularly a liquefied gas storage tank for marine equipment such as ships, where the liquefied gas includes, for example, liquefied natural gas, liquid nitrogen, liquid oxygen, liquid hydrogen, and liquid helium.

BACKGROUND ART

Liquefied natural gas (LNG) has become one of the world's most rapidly developing energy industries and the preferred alternative to petroleum due to its green, environmentally friendly, and highly efficient characteristics. With China's rapid economic development and increasingly stringent environmental protection requirements, LNG applications and development have garnered significant attention from various sectors. Particularly amid frequent haze weather occurrences, the importance of LNG has become more prominent, driving rapid growth in societal demand for clean energy. The development of LNG represents one of China's key focus areas for future clean energy initiatives.

LNG transportation typically relies on transport equipment such as ships and other marine vessels. The primary components of LNG receiving terminals include dock unloading systems, LNG storage facilities, processing systems, and export systems. Among these, LNG storage tanks—which undertake critical storage functions—require the longest construction timelines, incorporate the most advanced technologies, and present the greatest technical challenges, consistently managed as the critical path of the entire project. Moreover, the structural form and technological innovation of LNG storage tanks are also the focus of attention for domestic and international industry professionals.

In LNG storage tanks, the corrugated plates forming the sealing layer must maintain reliable sealing performance and structural stability under various operating conditions. Consequently, the configuration and quality of these corrugated plates are particularly crucial, imposing stringent requirements on their manufacturing processes. Existing corrugated plates exhibit room for improvement in material uniformity, surface smoothness, and structural strength at corrugation junctions—especially at intersections of transverse and longitudinal corrugations.

Therefore, there is a need to provide an improved corrugated plate and a storage container incorporating the same to at least partially address the aforementioned technical challenges.

SUMMARY OF THE INVENTION

To at least partially achieve the above objectives, the present invention provides a corrugated plate for a liquefied gas storage container. The corrugated plate comprises a plate body, a first corrugation, and a second corrugation. The first corrugation protrudes from the plate body by a first height along a height direction perpendicular to the plate body and extends along a first direction parallel to the plate body. The second corrugation protrudes from the plate body by a second height along the height direction and extends along a second direction parallel to the plate body. The first height is greater than the second height. A maximum width of the first corrugation perpendicular to the first direction is greater than a maximum width of the second corrugation perpendicular to the second direction. The first corrugation and the second corrugation are orthogonal to each other and form an intersection structure at an intersection position. The intersection structure comprises:

a top portion, wherein the top portion is located at a center of the intersection position, and a protruding height of the top portion relative to the plate body along the height direction is greater than the first height, ridges, consisting of four, each located in one of four quadrants formed by an orthogonal intersection of a first crest of the first corrugation and a second crest of the second corrugation, extending from the top portion toward the plate body, wherein an overall extension direction of each ridge intersects the first direction, the second direction, and the height direction, respectively; and recessed portions, consisting of four, each located in one of the four quadrants, formed on an outer side of the first corrugation and sandwiched between the first crest of the first corrugation and the corresponding ridge, concaved inward relative to the outer side of the first corrugation.

In some embodiments, the ridge terminates at the outer side of the first corrugation.

In some embodiments, the ridge smoothly connects and transitions with the outer side of the first corrugation.

In some embodiments, the recessed portion has a recessed edge defined by a transition portion of the outer side of the first corrugation changing from convex or flush to concave, the recessed edge smoothly connects and transitions with the ridge.

In some embodiments, the recessed edge extends from the ridge to the first crest of the first corrugation, such that the recessed portion is enclosed by the ridge, the recessed edge, and the first crest of the first corrugation.

In some embodiments, in a plane perpendicular to the height direction, a projection of the recessed edge is an outwardly convex curve, an angle between a projection of the ridge and the first direction is greater than an angle between a tangent line of the projection of the recessed edge and the first direction, and a length component of the projection of the ridge along the first direction is smaller than a length component of the projection of the recessed edge along the first direction.

In some embodiments, starting from the ridge, as the recessed edge extends, an angle between a tangent line of the projection of the recessed edge in the plane perpendicular to the height direction and the first direction gradually increases.

In some embodiments, a concave depth of the recessed portion relative to the outer side of the first corrugation gradually increases along a direction from an edge of the recessed portion toward a center of the recessed portion.

In some embodiments, when viewed along the height direction, the ridge and the recessed portion are symmetric relative to at least one of the first crest of the first corrugation or the second crest of the second corrugation.

In some embodiments, a height of the first crest of the first corrugation at a position forming the recessed portion is flush with a height of the first crest at other positions of the first corrugation.

In some embodiments, a groove portion is formed between two ridges on a same side of the first corrugation and located above the second corrugation, wherein a groove bottom of the groove portion extends perpendicular to the plate body.

According to another aspect, the invention also provides a liquefied gas storage container, comprising a wall including a base layer and a sealing layer disposed on an inner side of the base layer, wherein the sealing layer comprises the corrugated plate as described in any of the foregoing embodiments.

According to the present invention, the intersection structure enables uniform line lengths on both upper and lower surfaces of the corrugated plate at intersection positions during formation of the second corrugations, thereby achieving uniform thickness distribution without excessive thickening or thinning, while providing enhanced structural strength and improved fatigue resistance characteristics.

DESCRIPTION OF DRAWINGS

To better understand the above and other objectives, features, advantages, and functions of the present invention, reference may be made to the preferred embodiments illustrated in the accompanying drawings. The same reference numerals in the drawings denote the same components. A person skilled in the art should understand that the drawings are intended to schematically illustrate preferred embodiments of the present invention and do not limit the scope of the present invention in any way. The components in the drawings are not drawn to scale.

REFERENCE SIGNS LIST

Figure 1:
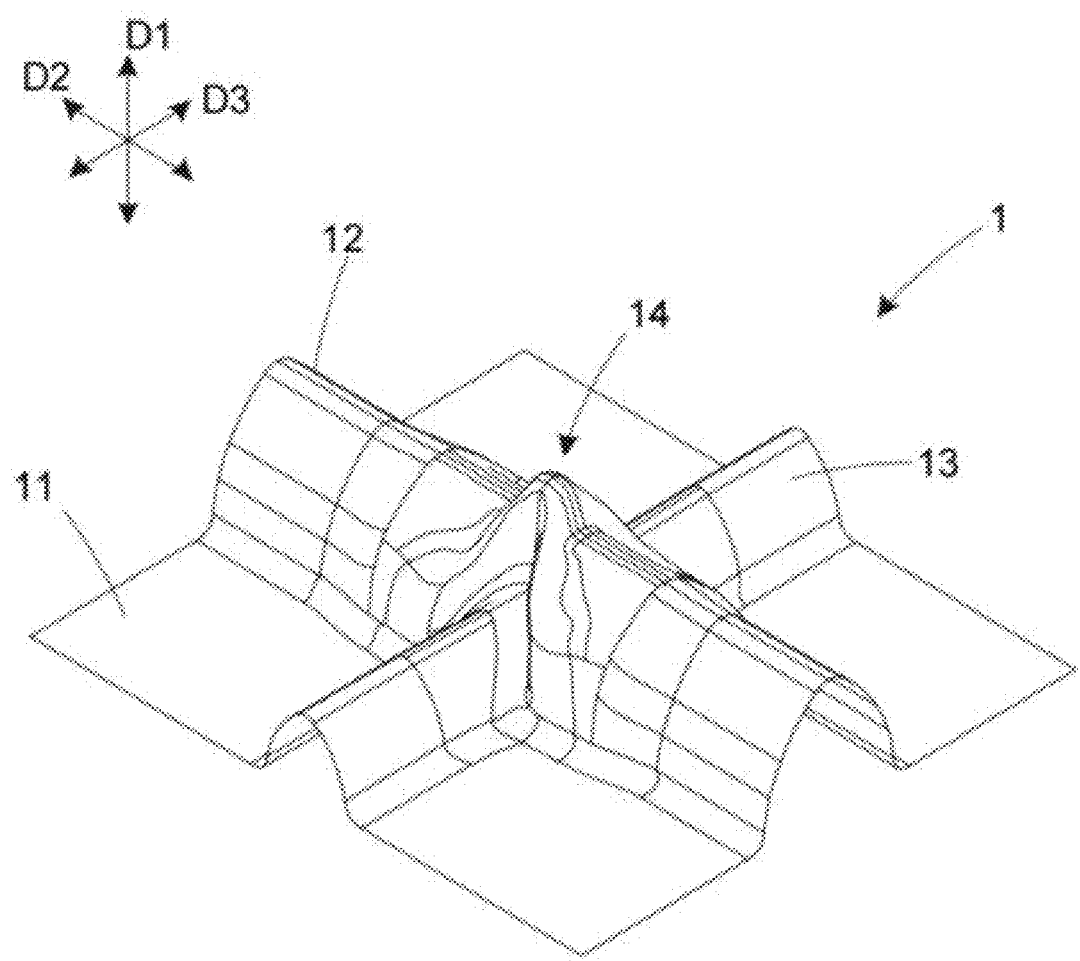
FIG. 1 is a perspective view of a corrugated plate according to a preferred embodiment of the present invention.

1. Corrugated plate;
11. Plate main body;
12. First corrugation;
121. First crest;
13. Second corrugation;
131. Second crest;
14. Intersection structure;
141. Top portions;
142. Ridges;
143. Recessed portions;
144. Recessed edge;
145. Groove portion;
146. Groove bottom;
2. Processing device;
21. First mold;
211. Avoidance groove;
212. Shaping groove;
22. Pressure plate;
23. Second mold;
231. Shaping protrusion;
24. Auxiliary shaping component;
241. Auxiliary shaping protrusion;
242. Notch portion;
D1. Height direction;
D2. First direction;
D3. Second direction.

DETAILED DESCRIPTION OF EMBODIMENTS

Referring now to the drawings, the specific embodiments of the present invention will be described in detail. The description herein is merely of preferred embodiments of the present invention, and those skilled in the art may conceive of other embodiments capable of realizing the invention based on the preferred embodiments described, which other embodiments likewise fall within the scope of the present invention.

The present invention provides a corrugated plate, which is preferably made of a metal material (e.g., steel) and suitable for manufacturing storage containers, particularly storage containers for liquefied gases such as liquefied natural gas (LNG), liquid nitrogen, liquid oxygen, liquid hydrogen, and liquid helium, which can be used in marine engineering equipment or land-based engineering equipment. The preferred embodiments of the corrugated plate will now be described with reference to FIGS. 1 to 5.

As shown in FIG. 1, the corrugated plate 1 is processed from a flat metal plate and includes a plate body 11, a first corrugation 12, and a second corrugation 13. Among them, both the first corrugation 12 and the second corrugation 13 protrude outward relative to the plate body 11 in a direction substantially perpendicular to the plane where the plate body 11 is located. The protruding direction may be referred to as the height direction D1. The protruding height (first height) of the first corrugation 12 relative to the plate body 11 is greater than the protruding height (second height) of the second corrugation 13 relative to the plate body 11. The protrusion height here refers to the maximum distance by which the first corrugation 12 and the second corrugation 13 protrude outward relative to the plate body 11, that is, the height of the crest. Additionally, the first corrugation 12 extends along the first direction D2 on the plate body 11. The second corrugation 13 extends along the second direction D3 on the plate body 11. The first direction D2 and the second direction D3 are substantially perpendicular. That is, the first corrugation 12 and the second corrugation 13 are substantially orthogonal to each other.

In some embodiments, both the first corrugation 12 and the second corrugation 13 may be configured as arc-shaped corrugations. For example, referring to FIGS. 3 and 4, when viewed along their respective extending directions, the first corrugation 12 and the second corrugation 13 have projection contours formed in an arc shape, with their respective apexes shaped as arcs without any angular features. Certainly, it is understandable that in other embodiments, at least one of the first corrugation and the second corrugation may be formed as a triangular corrugation. For example, when viewed along its extending direction, the projection contour of the corrugation forms a substantially triangular shape, which may have an angular apex. Herein, the maximum width of the first corrugation 12 perpendicular to its extending direction (first direction D2) is greater than the maximum width of the second corrugation 13 perpendicular to its extending direction (second direction D3). With reference to features such as height and width, the first corrugation 12 may also be referred to as a large corrugation, and the second corrugation 13 may also be referred to as a small corrugation.

The first corrugation 12 and the second corrugation 13 extend and intersect, forming an intersection structure 14 at the intersection position. The intersection structure 14 enhances the structural strength of the corrugated plate 1 at the intersection position, thereby prolonging its service life.

Figure 2:
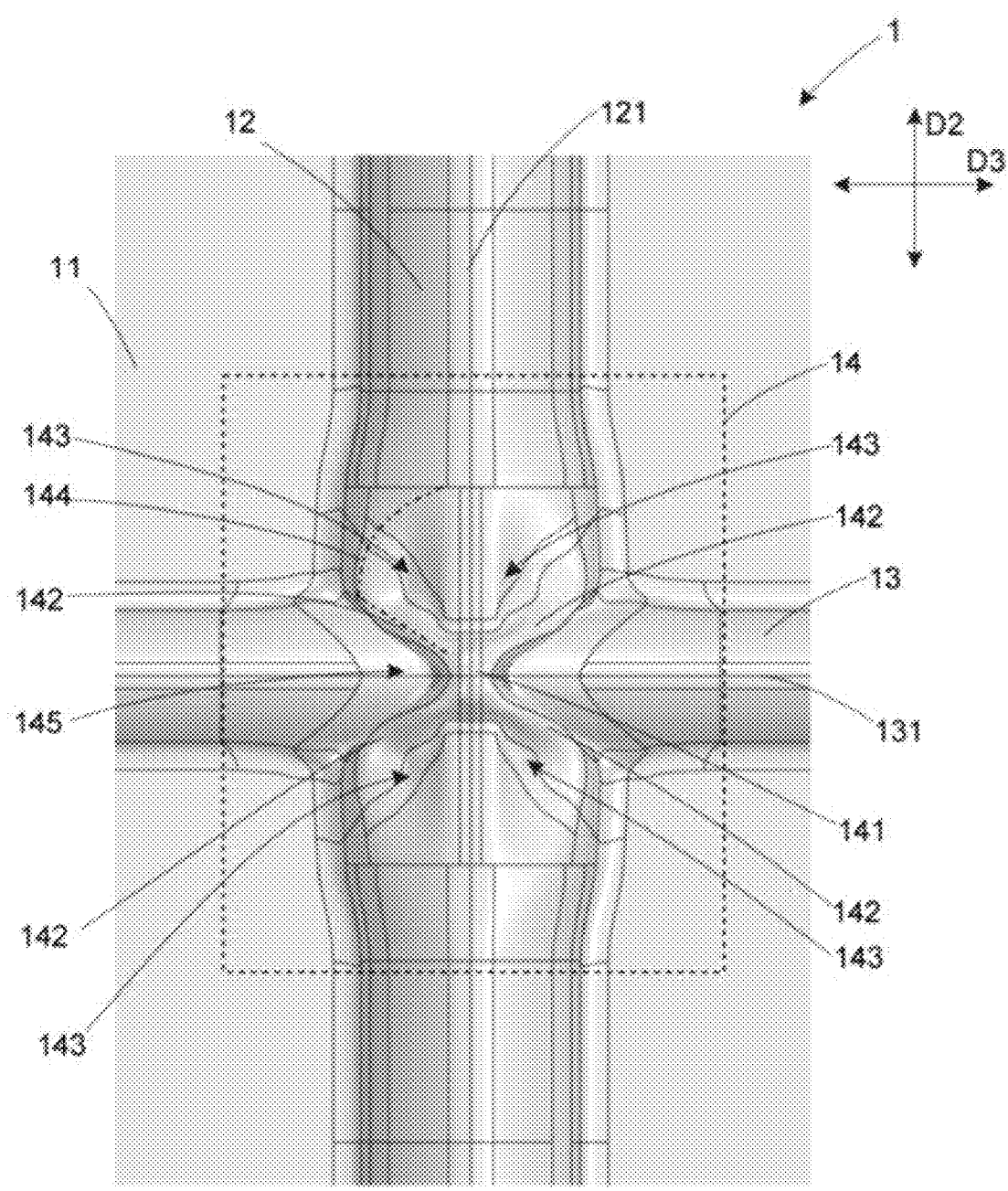
FIG. 2 is a top view of the corrugated plate shown in FIG. 1 as observed along the height direction.

The intersection structure 14 includes a top portion 141, which protrudes outward from the center of the intersection position relative to the plate body 11 along the height direction D1. The protruding height of the top portion 141 is greater than the protruding height of the first corrugation 12. Referring to FIG. 2, the first corrugation 12 is orthogonal to the second corrugation 13, so the first crest 121 of the first corrugation 12 and the second crest 131 of the second corrugation 13 can be regarded as two orthogonal coordinate axes, which divide the surrounding plate body 11 into four quadrants. The top portion 141 can be regarded as the origin of the coordinate axis. Four ridges 142 extend from the top portion 141 toward the plate body 11. Each quadrant is provided with a ridge 142. As can be seen from FIG. 2, the extending direction of each ridge 142 intersects with the first direction D2 and the second direction D3. As can be seen from FIG. 3, the extension direction of the ridge 142 also intersects with the height direction D1. The ridges are formed during the intersection process by outward bending and protrusion of the corrugated plate's sheet material.

According to the present invention, the intersection structure 14 is also formed with a recessed portion 143. Similar to the ridge 142, the recessed portion 143 comprises four parts, each located in a respective quadrant. Specifically, the concave portion 143 is disposed on the outer side of the first corrugation 12, located between the ridge 142 and the first crest 121 of the first corrugation 12. The recessed portion 143 is configured to be recessed inward relative to the outer side of the first corrugation 12. That is, for the first corrugation 12, the recessed portions 143 are respectively disposed on both sides of its first crest 121. The structure of the first peak 121 remains unchanged, consistently maintaining an outwardly convex shape. That is, the height of the first crest 121 of the first corrugation 12 at the intersection structure 14 is flush with the height of the first crest 121 of the first corrugation 12 at other positions, thereby maintaining the structural strength of the first corrugation 12 unaffected. Preferably, the recessed depth of the concave portion 143 gradually increases from its outer edge toward its interior.

It can be understood that during the corrugation forming process, material accumulation occurs at certain locations of the sheet material, while material stretching occurs at other locations, resulting in uneven thickness distribution of the sheet material, which adversely affects its strength. By providing the top portion 141, the ridges 142, and the recessed portions 143, the intersection structure 14 can absorb material accumulation generated at the intersection during corrugation formation and preferentially distribute the accumulated material toward the stretched regions of the sheet. This configuration enables the corrugated plate to achieve uniform line lengths on both upper and lower surfaces at the intersection, thereby ensuring uniform thickness and preventing excessive thickening or thinning. Metallographic analysis shows that the intersection structure achieves a maximum thinning rate of less than 5%, ensuring material thickness uniformity and stable product performance. Additionally, compared to conventional corrugated plates with trenches formed at the crests, the present invention can achieve superior structural strength and fatigue resistance. Finite element analysis shows that under extreme working conditions, the maximum strain of the intersecting structure is 2%, far below the ultimate strain that causes structural damage to most metal materials (for example, the single tensile ultimate strain that causes structural damage to stainless steel typically exceeds 40%). This ensures the safety of the intersecting structure and the entire corrugated plate during service.

The ridge 142 extends from the top portion 141 toward the plate body 11, preferably terminating on the outer side of the first corrugation 12 without extending to the plate body 11. This facilitates maintaining the integral structure of the plate body 11. Meanwhile, the smooth connection between the ridge 142 and the first corrugation 12 enhances structural strength while avoiding stress concentration.

It is understandable that a recessed portion 143 is formed on the outer side of the first corrugation 12, where the outer side transitions from convex or flush to concave, defining a recessed edge 144 of the recessed portion 143. In essence, it forms a small and less prominent ridge on the outer side of the first corrugation 12. The alternating convex and concave variations further enhance the structural strength of the corrugated plate 1 at the intersection structure 14.

Figure 3:
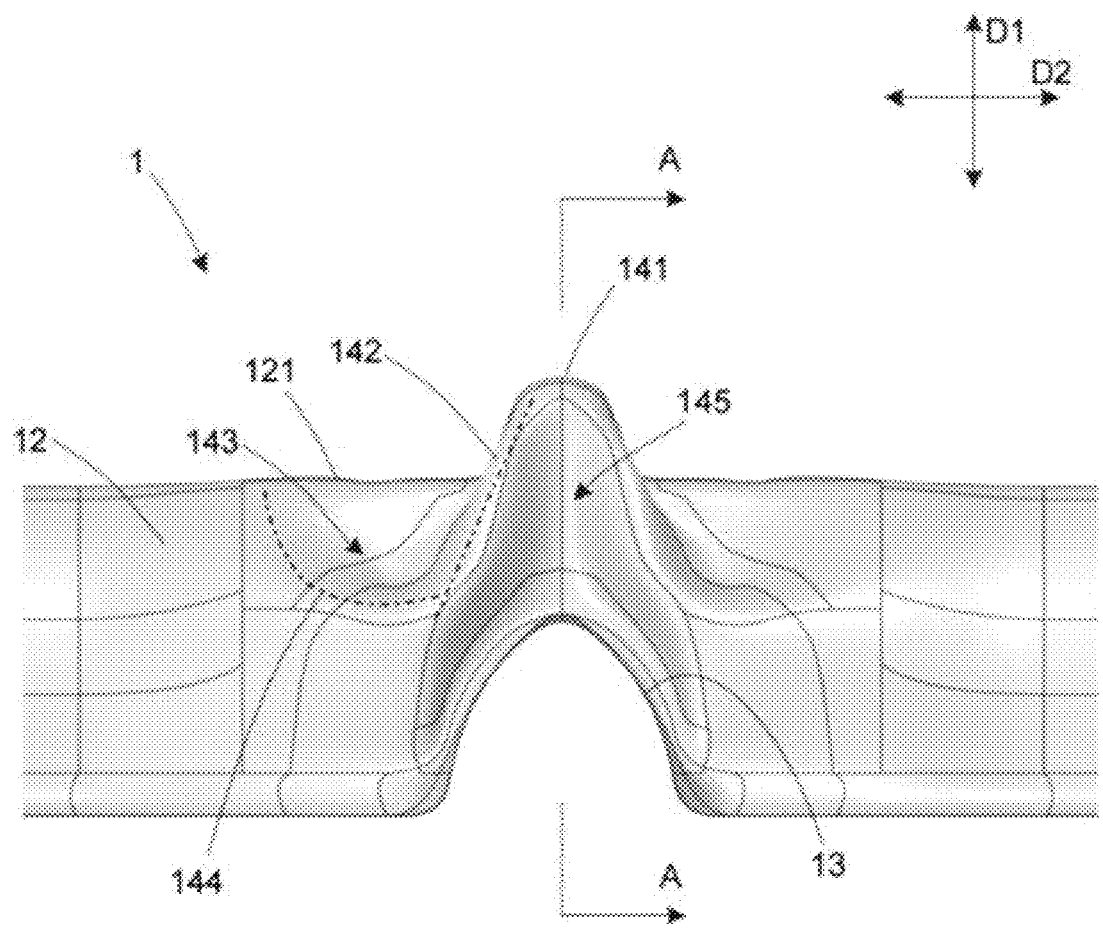
FIG. 3 is a side view of the corrugated plate shown in FIG. 1 as viewed along a second direction.
Figure 4:
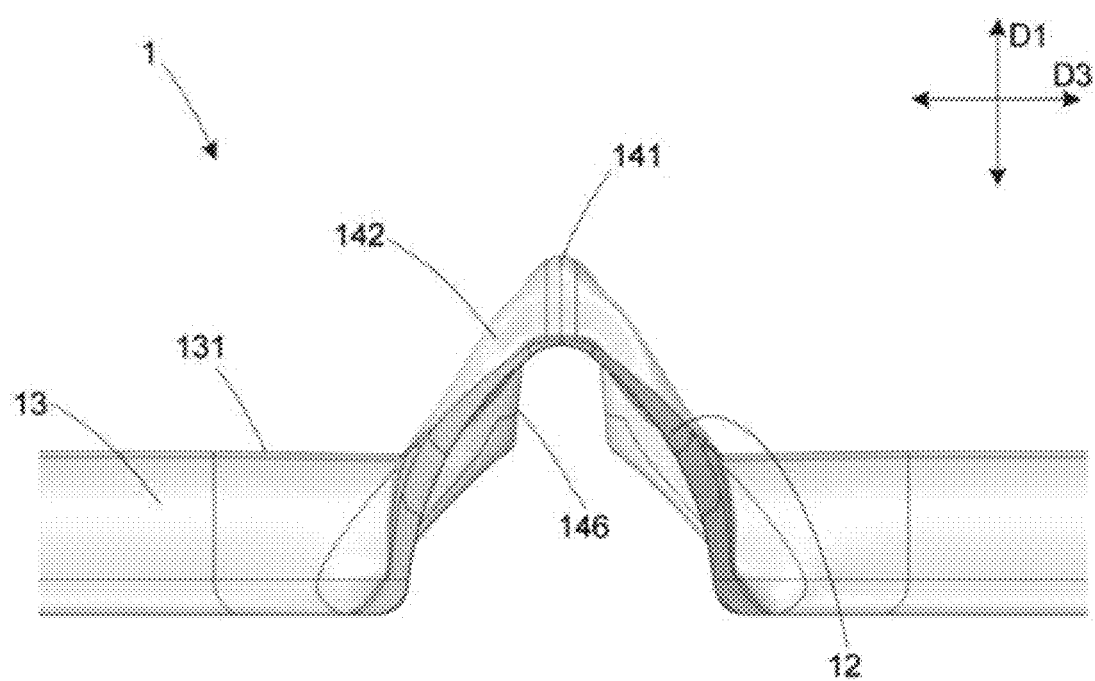
FIG. 4 is a side view of the corrugated plate shown in FIG. 1 as viewed along a first direction.
Figure 5:
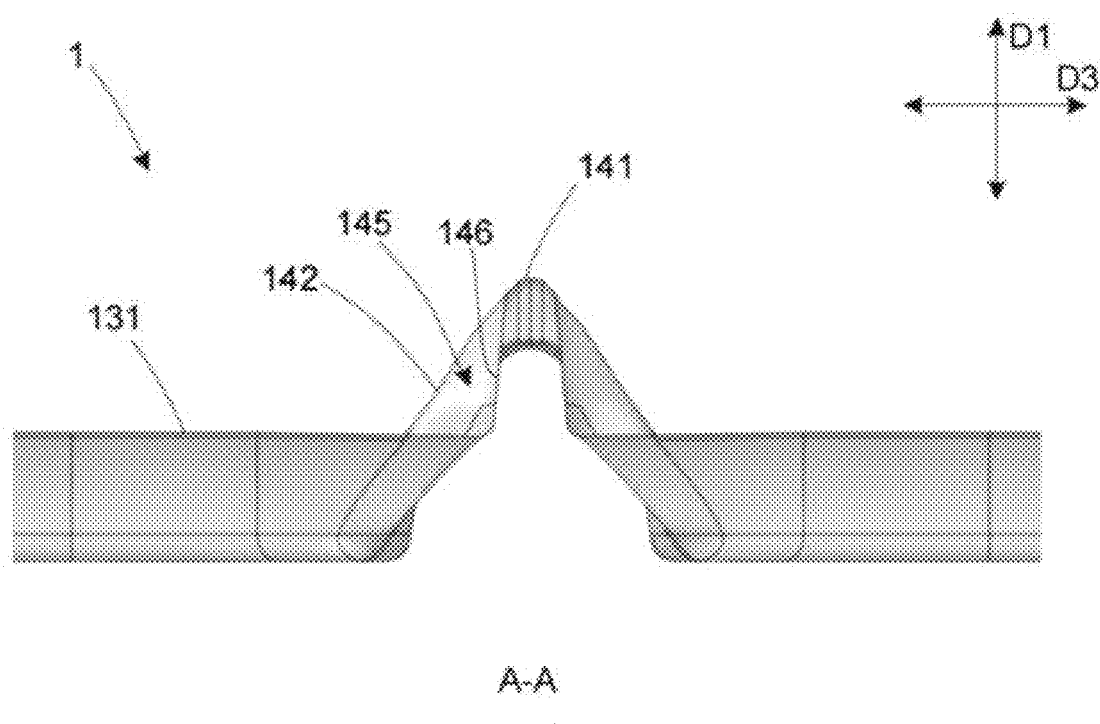
FIG. 5 is a cross-sectional view taken along line A-A in FIG. 3.

Preferably, the recessed edge 144 and the ridge 142 smoothly connect and transition on the outer side of the first corrugation 12. That is to say, no distinct connecting location is actually formed between the recessed edge 144 and the ridge 142, thereby avoiding any abrupt shape change, which is beneficial for preventing stress concentration. For illustrative purposes, the recessed edge 144 is symbolically shown as a curved dashed line in FIGS. 2 and 3, and the ridge 142 is symbolically shown as a substantially straight dashed line. It is to be understood that these dot-dash lines are used only to indicate the approximate direction of the recessed edge 144 and ridge 142, and not to represent their actual shape. As shown in FIGS. 2 and 3, the recessed edge 144 extends toward the first crest 121 of the first corrugation 12 at one end, while smoothly connecting with the ridge 142 at the other end. Whether viewed along the height direction D1 in FIG. 2 or along the second direction D3 in FIG. 3, the projection of the recessed edge 144 in the corresponding plane is configured as an outwardly convex curve.

Preferably, as shown in FIG. 2, in some embodiments, for a projection curve segment of the recessed edge 144 in a plane perpendicular to the height direction D1, the angle between its tangent and the first direction D2 is smaller than the angle between the projection of the ridge 142 and the first direction D2. Moreover, as the recessed edge 144 extends toward the first crest 121 of the first corrugation 12, the angle between the tangent of its projected curve segment and the first direction D2 gradually increases. Additionally, the dimension between the two ends of the projection curve segment of the recessed edge 144 along the first direction D2 is greater than the dimension between the two ends of the projection of the ridge 142 along the first direction D2 (corresponding to the distance along the first direction D2 between the connection of both the recessed edge 144 and the ridge 142 and the top portion 141).

In this manner, for the continuous raised structure formed by the recessed edge 144 and the ridge 142, as the ridge 142 extends, the distance between the continuous raised structure and the first crest 121 of the first corrugation 12 along the second direction D3 gradually increases, reaching a maximum distance at the connection of the recessed edge 144 and the ridge 142. Furthermore, as the recessed edge 144 extends toward the first crest 121, the distance between the continuous raised structure and the first crest 121 gradually converges and decreases along the second direction D3, reaching a minimum at the end of the recessed edge 144 away from the ridge 142. Herein, the extension component of the ridge 142 along the first direction D2 is smaller than the extension component of the recessed edge 144 along the first direction D2. Therefore, on the same side of the second corrugation 13, when viewed along the height direction D1, the ridges 142 and corresponding recessed edges 144 located on both sides of the first corrugation 12 form a structure with an approximately heart-shaped pattern. Preferably, the intersection structure 14 may have substantially the same shape in each quadrant, such that it is formed as a structure symmetrical relative to the first crest 121 of the first corrugation 12 and/or the second crest 131 of the second corrugation 13. Preferably, the recessed edge 144 extends to the first crest 121 of the first corrugation 12, such that the recessed portion 143 is enclosed by the corresponding ridge 142, the recessed edge 144, and the first crest 121 of the first corrugation 12.

Referring to FIG. 3, on the same side of the first corrugation 12, a groove portion 145 is formed above the second corrugation 13 between two ridges 142 located on both sides of the second corrugation 13. Furthermore, as can be seen from FIGS. 4 and 5, the bottom 146 of the groove portion 145 extends approximately along the height direction D1 (i.e., substantially perpendicular to the plate body 11). This structure facilitates enhanced strength of the ridge 142 and the top portion 141, improving their capability to withstand impact loads perpendicular to the plate body 11.

Figure 6:
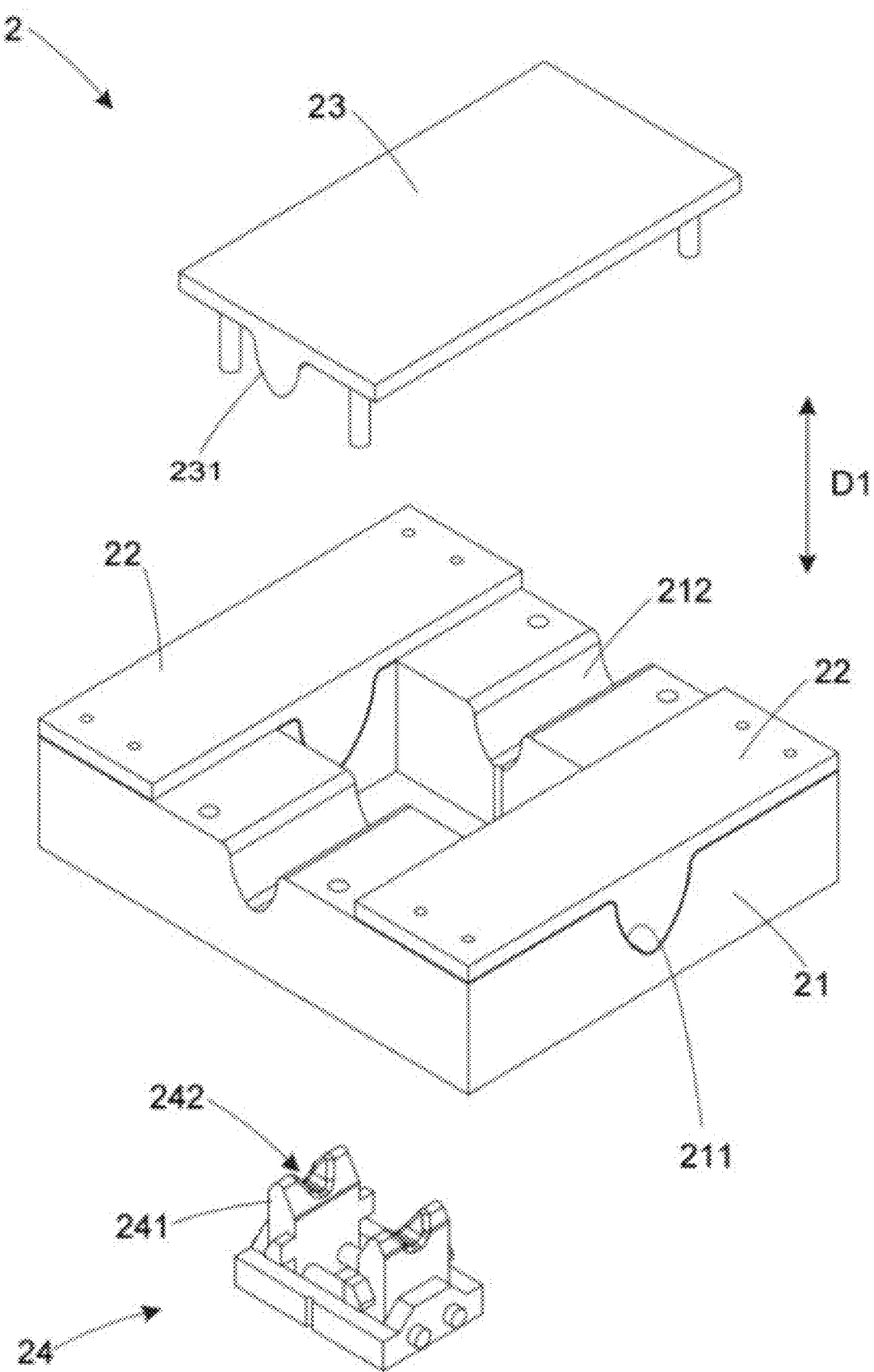
FIG. 6 is a schematic diagram of a processing device for manufacturing the corrugated plate according to the present invention.

FIG. 6 illustrates a processing device 2 for manufacturing the corrugated plate according to the present invention—particularly for processing its intersection structure—which comprises a first mold 21, a pressure plate 22, a second mold 23, and an auxiliary shaping member 24. It is understandable that the first corrugation 12 and the second corrugation 13 can be formed separately through two independent processes. The processing device 2 is used for further processing of a plate that has been pre-processed with the first corrugation 12. To address this, the first mold 21 is provided with an avoidance groove 211. During processing, the pre-processed first corrugation 12 can be placed in the avoidance groove 211, allowing the plate body 11 to rest against the upper surface of the first mold 21. Then, the pressure plate 22 is attached to the first mold 21. Preferably, the pressure plate 22 is provided with a pressure protrusion, which extends into the first corrugation 12 to press it tightly into the avoidance groove 211.

The first mold 21 is further provided with a shaping groove 212 for forming the second corrugation 13. Correspondingly, the second mold 23 is provided with a shaping protrusion 231. When the sheet material is pressed against the first mold 21, the second mold 23 moves toward the first mold 21, and its shaping protrusion 231 presses the sheet material into the shaping groove 212 to form the second corrugation 13. At the middle of the shaping protrusion 231, there is also provided a tab (not shown) that protrudes outward under the action of elastic force (e.g., applied by a spring), which extends farther from the shaping protrusion 231. The tab presses against the intersection of the first corrugation 12 and the second corrugation 13, and in cooperation with the corresponding shape in the shaping groove 212, forms the top 141, ridge 142, and groove portion 145 of the intersection structure 14.

Additionally, the auxiliary shaping member 24 is disposed on a side of the first mold 21 opposite to the second mold 23 and comprises two auxiliary shaping protrusions 241, which are respectively located on both sides of the shaping protrusion 231 of the second mold 23. Each auxiliary shaping protrusion 241 has a notch portion 242 at a position corresponding to the crest of the first corrugation 12. The auxiliary shaping member 24 synchronously compresses the sheet material with the second mold 23. Herein, the notch portion 242 provides clearance for the first crest 121 of the first corrugation 12, while the two endpoints of the notch portion 242 press against the outer side of the first corrugation 12 on both sides of the first crest 121, thereby forming two recessed portions 143 and corresponding recessed edges 144 on both sides of the first crest 121 of the first corrugation 12. In this manner, the corrugated plate processing is completed.

The corrugated plate according to the present invention can be used to form part of the wall of a storage container. In some embodiments, the wall of the storage container sequentially comprises from the outer side to the inner side: a secondary insulation layer, a secondary sealing layer, a primary insulation layer, and a primary sealing layer. That is, the primary sealing layer is located at the innermost side of the container wall and in contact with the contents (e.g., LNG) in the storage container, while the secondary insulation layer is positioned at the outermost side. Among them, both the secondary sealing layer and the primary sealing layer can be composed of the corrugated plate according to the present invention. The secondary insulation layer and the main insulation layer are both composed of insulation boards made of thermal insulation materials (such as plywood) arranged in sequence. The secondary insulation layer and the main insulation layer may also be referred to as the base layer.

The above description of various embodiments of the present invention is provided to enable a person skilled in the relevant art to practice the invention. It is not intended to limit or confine the present invention exclusively to a single disclosed embodiment. As described above, those of ordinary skill in the art to which the above teachings pertain will recognize various alternatives and modifications to the present invention. Therefore, although specific alternative embodiments have been described, those of ordinary skill in the art will appreciate or relatively easily develop other embodiments. The present invention is intended to include all alternatives, modifications, and variations of the invention described herein, as well as other embodiments that fall within the spirit and scope of the above-described invention.

What is claimed is:

1. A corrugated plate for liquefied gas storage containers, comprising: a plate body, a first corrugation, and a second corrugation, wherein the first corrugation protrudes from the plate body by a first height along a height direction perpendicular to the plate body and extends along a first direction parallel to the plate body, the second corrugation protrudes from the plate body by a second height along the height direction and extends along a second direction parallel to the plate body, the first height is greater than the second height, a maximum width of the first corrugation perpendicular to the first direction is greater than a maximum width of the second corrugation perpendicular to the second direction, the first corrugation and the second corrugation are orthogonal to each other and form an intersection structure at an intersection position, wherein the intersection structure comprises: a top portion located at a center of the intersection position, protruding from the plate body along the height direction by a height greater than the first height; ridges, consisting of four, each located in one of four quadrants formed by an orthogonal intersection of a first crest of the first corrugation and a second crest of the second corrugation, extending from the top portion toward the plate body, wherein an overall extension direction of each ridge intersects the first direction, the second direction, and the height direction, respectively; and recessed portions, consisting of four, each located in one of the four quadrants, formed on an outer side of the first corrugation and sandwiched between the first crest of the first corrugation and the corresponding ridge, concaved inward relative to the outer side of the first corrugation;

each recessed portion has a recessed edge defined by a transition portion of the outer side of the first corrugation changing from convex or flush to concave, the recessed edge extends from the ridge to the first crest of the first corrugation, such that the recessed portion is enclosed by the ridge, the recessed edge, and the first crest of the first corrugation; and wherein a concave depth of the recessed portion relative to the outer side of the first corrugation gradually increases along a direction from an edge of the recessed portion toward a center of the recessed portion.

2. The corrugated plate according to claim 1, wherein the ridge terminates at the outer side of the first corrugation.

3. The corrugated plate according to claim 2, wherein the ridge is connected with the outer side of the first corrugation.

4. The corrugated plate according to claim 2, wherein in a plane perpendicular to the height direction, a projection of the recessed edge is an outwardly convex curve, an angle between a projection of the ridge and the first direction is greater than an angle between a tangent line of the projection of the recessed edge and the first direction, and a length component of the projection of the ridge along the first direction is smaller than a length component of the projection of the recessed edge along the first direction.

5. The corrugated plate according to claim 4, wherein starting from the ridge, as the recessed edge extends, an angle between a tangent line of the projection of the recessed edge in the plane perpendicular to the height direction and the first direction gradually increases.

6. The corrugated plate according to claim 1, wherein the recessed edge is connected with the ridge.

7. The corrugated plate according to claim 1, wherein when viewed along the height direction;
- two of the ridges, which are disposed on opposite sides of the first crest of the first corrugation, are symmetric relative to the first crest; and/or
- two of the recessed portions, which are disposed on opposite sides of the first crest of the first corrugation, are symmetric relative to the first crest; and/or
- two of the ridges, which are disposed on opposite sides of the second crest of the second corrugation, are symmetric relative to the second crest; and/or
- two of the recessed portions, which are disposed on opposite sides of the second crest of the second corrugation, are symmetric relative to the second crest.

8. The corrugated plate according to claim 1, wherein a height of the first crest of the first corrugation at a position forming the recessed portion is flush with a height of the first crest at other positions of the first corrugation.

9. The corrugated plate according to claim 1, wherein a groove portion is formed between two ridges on a same side of the first corrugation and located above the second corrugation, wherein a groove bottom of the groove portion extends perpendicular to the plate body.

10. A liquefied gas storage container, comprising a wall including a base layer and a sealing layer disposed on an inner side of the base layer, wherein the sealing layer comprises the corrugated plate according to claim 1.

* * * * *